(12) United States Patent
Reddehase et al.

(10) Patent No.: US 12,215,738 B2
(45) Date of Patent: Feb. 4, 2025

(54) THREE-POINT LINK

(71) Applicant: ZF FRIEDRICHSHAFEN AG, Friedrichshafen (DE)

(72) Inventors: Günter Reddehase, Brockum (DE); Jörg Heemann, Diepholz (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 421 days.

(21) Appl. No.: 17/782,524

(22) PCT Filed: Nov. 20, 2020

(86) PCT No.: PCT/EP2020/082805
§ 371 (c)(1),
(2) Date: Jun. 3, 2022

(87) PCT Pub. No.: WO2021/121856
PCT Pub. Date: Jun. 24, 2021

(65) Prior Publication Data
US 2023/0003250 A1    Jan. 5, 2023

(30) Foreign Application Priority Data

Dec. 17, 2019 (DE) ............... 10 2019 219 830.9

(51) Int. Cl.
*F16C 11/06*   (2006.01)
*B60G 7/00*   (2006.01)

(52) U.S. Cl.
CPC .......... *F16C 11/0623* (2013.01); *B60G 7/005* (2013.01)

(58) Field of Classification Search
CPC ... F16C 11/06; F16C 11/0604; F16C 11/0609; F16C 11/0614; F16C 2326/05
See application file for complete search history.

(56) References Cited

U.S. PATENT DOCUMENTS

| | | | | |
|---|---|---|---|---|
| 1,809,703 A | * | 6/1931 | Hufferd | F16C 11/0628 403/140 |
| 4,712,940 A | * | 12/1987 | Wood, Jr. | F16C 11/0628 403/133 |

(Continued)

FOREIGN PATENT DOCUMENTS

| | | | |
|---|---|---|---|
| DE | 102004056939 A1 * | 6/2006 | ............. B60G 7/005 |
| DE | 112006000910 | 3/2008 | |

(Continued)

OTHER PUBLICATIONS

Search Report dated Mar. 9, 2020 issued in German Patent Application No. 10 2019 219 830.9.

(Continued)

*Primary Examiner* — Jonathan P Masinick
(74) *Attorney, Agent, or Firm* — COZEN O'CONNOR (57) ABSTRACT

A three-point link having two control arms forming an acute angle and meet at a central joint. The central joint has a cylindrical dome extending perpendicular to a plane defined by the control arms. The central joint has a joint ball penetrated by the dome. To prevent separation of the central joint, it has a captive securing device which functions as a stop that extends perpendicular to an axial direction. The securing device is penetrated by the dome and is secured against axial withdrawal by an annular securing element. Viewed in axial direction, the annular securing element is arranged on a side of the captive securing device) remote of the joint ball and engages in a circumferential groove of the dome. The annular securing element is snugly surrounded in radial direction by the captive securing device to prevent a withdrawal of the annular securing element from the circumferential groove.

14 Claims, 5 Drawing Sheets

(56) References Cited

U.S. PATENT DOCUMENTS

| | | | | | |
|---|---|---|---|---|---|
| 4,986,689 | A * | 1/1991 | Drutchas | ............... | F16C 11/106 |
| | | | | | 403/135 |
| 7,708,488 | B2 * | 5/2010 | Kunze | .................... | B60G 7/005 |
| | | | | | 403/116 |
| 8,038,162 | B2 * | 10/2011 | Knopp | ............... | F16C 11/0609 |
| | | | | | 403/77 |
| 8,453,787 | B2 * | 6/2013 | Rager | .................... | B60G 9/022 |
| | | | | | 280/124.156 |
| 8,668,214 | B2 * | 3/2014 | Elliott | ..................... | B60G 9/00 |
| | | | | | 280/124.156 |
| 8,708,594 | B2 * | 4/2014 | Brunneke | ............. | B60G 7/008 |
| | | | | | 403/135 |
| 8,851,785 | B1 * | 10/2014 | Belleau | ............... | F16C 11/0671 |
| | | | | | 403/135 |
| 9,751,370 | B2 * | 9/2017 | Weifenbach | ........... | B62D 17/00 |
| 10,207,554 | B2 * | 2/2019 | Schroeder | ................ | B60G 7/02 |
| 10,288,173 | B2 * | 5/2019 | Chapagain | ............. | F16C 11/04 |
| 10,480,567 | B2 * | 11/2019 | Goellner | ................ | F16C 11/12 |
| 10,527,089 | B2 * | 1/2020 | Winter | ................ | F16C 11/0623 |
| 11,345,202 | B2 * | 5/2022 | Reddehase | ............ | B60G 7/005 |
| 11,578,752 | B2 * | 2/2023 | Koppen | ............. | F16C 11/0604 |
| 2011/0153157 | A1 * | 6/2011 | Klank | .................... | B60G 7/005 |
| | | | | | 701/37 |
| 2019/0232746 | A1 * | 8/2019 | Yu | ........................... | F16C 11/00 |

FOREIGN PATENT DOCUMENTS

| | | | | |
|---|---|---|---|---|
| DE | 102017214963 | | 2/2019 | |
| FR | 1507730 | A * | 12/1967 | |
| FR | 2131316 | | 11/1972 | |
| WO | WO 99/28636 | | 6/1999 | |
| WO | WO-2005080101 A1 | * | 9/2005 | ............. B60G 7/005 |
| WO | WO-2005116465 A1 | * | 12/2005 | ............. B60G 7/005 |
| WO | WO-2006019309 A1 | * | 2/2006 | ............. B60G 7/005 |
| WO | WO 2006110049 | | 10/2006 | |
| WO | WO-2006110049 A2 | * | 10/2006 | ........... B60G 17/019 |

OTHER PUBLICATIONS

Standard 7993, "Round Wire Snap Rings and Snap Ring Grooves for Shafts and Bores", Apr. 1970, pp. 209-211.

Standard 3770, "O-rings with special dimensional accuracy, made of elastomers; Not for new construction", May 1986, 4 pages.

Office Action of corresponding German Patent Application No. 10 2019 219 830.9.

* cited by examiner

Prior Art

THREE-POINT LINK

CROSS REFERENCE TO RELATED APPLICATIONS

This is a U.S. national stage of Application No. PCT/EP2020/082805 filed Nov. 20, 2020. Priority is claimed on German Application No. DE 10 2019 219 830.9 filed Dec. 17, 2019 the content of which is incorporated herein by reference.

BACKGROUND OF THE INVENTION

1. Field of the Invention

The disclosure is directed to a three-point link.

2. Description of Related Art

Axle suspensions of utility vehicles, for example, utility vehicles for commercial transport of goods or persons, often have rear axles formed as rigid axles. Rigid axles of this type may be guided through a three-point link arranged above the rigid axle in an upper link plane. A three-point link of this kind has two control arms that form an acute angle with one another and simultaneously meet each by one end in a first bearing point. The three-point link is connected to a rigid axle body of the rigid axle in this first bearing point via a central joint, this central joint being associated with the three-point link and formed as a ball joint. The other two ends of the three-point link are connected to a vehicle frame via a guide joint, for example, a molecular joint, in each instance. The central joint allows rolling movements, i.e., rotational movements around the longitudinal axis of the vehicle, as well as deflection and rebound movements of the rigid axle. Beyond this, drive torques and braking torques are introduced into the three-point link via the central joint when the rigid axle is formed as a drive axle.

Due to increased wear or overloading of the central joint, connections between individual parts of the central joint can sever. In particular, an inner race and/or an outer race of a ball joint arranged inside of the central joint can wear so severely that these parts which are normally connected to one another by positive engagement separate from one another. The connection between the three-point link and the rigid axle body which is realized via the central joint could disengage as a result of a damage event of this kind. This could also be referred to as a separation of the central joint, which can lead to heavy material damage and possibly even personal injury. Therefore, captive securing devices that prevent a complete separation of the central joint are known from the prior art.

For example, a three-point link with a central joint known from DE 10 2017 214 963 A1 has a housing mounted to be rotatable and swivelable relative to an axle connection of the central joint by a ball joint. Further, the central joint has a captive securing device which functions as a stop, extends perpendicular to the centerline of the axle connection and prevents a separation of the housing and axle connection in the event of failure of the ball joint. A securing element formed as a retaining ring with rectangular cross section forms axial securing elements and prevents the withdrawal of the captive securing device in direction of the centerline of the axle connection. The axle connection has a cylindrically shaped dome having a centerline that is coextensive with the centerline of the axle connection. The retaining ring with rectangular cross section engages in a circumferential, likewise rectangular groove of the cylindrical dome. In an arrangement of this kind, there is a risk during driving operation that the retaining ring will come loose, by which is meant that the retaining ring works itself out of or escapes from the groove of the cylindrical dome. Further, in an arrangement of this kind unwanted rattling noises can occur during driving operation, for example, when changing from an acceleration process to a braking process, or vice versa. The reason for these rattling noises consists in a slight, tolerance-dependent possibility of movement of the captive securing device in direction of the centerline of the dome.

SUMMARY OF THE INVENTION

It is the object of one aspect of the invention to provide an arrangement by which the retaining element is prevented from coming loose from the circumferential groove of the dome.

One aspect of the present invention is a three-point link.

Accordingly, one aspect of the invention provides a three-point link that has two control arms that form an acute angle relative to one another and which simultaneously meet each by one end in a central joint. The central joint has a cylindrical dome that extends in an axial direction extending at least substantially perpendicular to a plane defined by the two control arms. Further, the central joint has a joint ball, which is penetrated by the dome. In order to prevent a complete separation of the central joint, this central joint has a captive securing device that functions as a stop and which extends in a radial direction oriented perpendicular to the axial direction. The captive securing device is likewise penetrated by the dome and is simultaneously secured against an axial withdrawal from the dome by an annular securing element. Viewed in axial direction, the annular securing element is arranged on a side of the captive securing device remote of the joint ball and engages in a circumferential groove of the dome at the same time. According to one aspect of the invention, the annular securing element is snugly surrounded in radial direction by the captive securing device to prevent a withdrawal of the annular securing element from the circumferential groove of the dome because the annular securing element cannot move out of the circumferential groove of the dome in radial direction.

In other words, the three-point link is one that is spread in a V-shaped manner. In particular, the three-point link is a component part of a suspension of a utility vehicle. In particular, the annular securing element is snugly surrounded in radial direction by the captive securing device such that the annular securing element and the captive securing device touch one another at a point, along a line or across a two-dimensional area. In particular, the annular securing element has a circumferential interruption to enable insertion into the circumferential groove of the cylindrical dome. In particular, the annular securing element has a solid full cross section. The annular securing element preferably comprises a high-strength spring steel. In particular, the captive securing device at least partially covers the joint ball viewed in parallel projection in axial direction. Further, the captive securing device can additionally cover parts of an inner contour of the housing of the central joint when viewed in parallel projection in axial direction.

In particular, the joint ball which is preferably made from steel is a component part of a ball joint and is therefore also referred to as inner race of the ball joint. The captive securing device can extend in a spatial direction operatively in radial direction, for example, in the form of a crossbar or in two spatial directions, for example, in the form of a disk. In particular, the captive securing device has a continuous cylindrical bore hole which extends in axial direction, the inner diameter of which is smaller than a maximum outer diameter of the annular securing element.

The annular securing element is preferably surrounded in radial direction at least substantially circumferentially by the captive securing device. Because it is circumferentially surrounded, the annular securing element is additionally protected against coming loose, for example, compared to if it were merely partially circumferentially surrounded.

The annular securing element advisedly has a circular full cross section. In particular, the annular securing element is formed as a circumferentially interrupted torus. For example, the annular securing element is formed as a round-wire snap ring for shafts in accordance with DIN 7993, type A.

The captive securing device advantageously makes full surface contact with the annular securing element. In this way, the annular securing element is additionally prevented from escaping.

Further, the annular securing element advantageously makes full surface contact with the circumferential groove of the cylindrical dome. In particular, one half of the cross-sectional surface area of the annular securing element is arranged in the circumferential groove of the cylindrical dome. In particular, the cross-sectional portion of the annular securing element which is arranged in the circumferential groove of the cylindrical dome is semispherical.

The annular securing element preferably contacts the captive securing device such that it forms a contact surface at least substantially surrounding the dome, the contact surface being formed as a quarter-circle curve when viewed in an axial section through the central joint. In particular, the contact surface, which at least substantially surrounds the dome, is circumferentially interrupted at a location when the annular securing element is formed as a circumferentially interrupted torus. For example, the outer diameter of the cylindrical dome and the inner diameter of the captive securing device can have a diameter of 28 millimeters, both diameters being toleranced such that a circumferential gap having a width on the order of about 0.05 millimeters is formed between the two above-mentioned structural component parts. With a dimensioning of this kind, for example, as a circumferentially interrupted torus comprising high-strength spring steel, the annular securing element can be formed with a full circular cross section having a diameter of 2 millimeters. Such a construction of the annular securing element is also known from DIN 7993, type A (round-wire snap rings for shafts). Practical experiments conducted by the present applicant with an arrangement of this kind have shown that, with a constantly increasing force acting in axial direction of the central joint, the toroidal securing element made from spring steel shears off at failure accompanied by formation of a cylindrical shell-shaped shear surface with a diameter of 28 millimeters and an extension in axial direction of 2 millimeters.

According to a further development, the captive securing device is preloaded in axial direction by a spring element. In particular, the spring element surrounds the dome with no interruption. The unwanted rattling noises which can occur in driving operation, for example, when changing from an acceleration process to a braking process, or vice versa, as described in the introductory part can be prevented by the spring element. The spring element can be formed, for example, as a plate spring, as a spring ring or as a fan-shaped washer. The spring element can also be formed from a plurality of individual spring elements which are arranged to form a spring assembly, for example, by stacking in axial direction.

The spring element is preferably formed as an O-ring of elastomer material. Such O-rings are also called round sealing rings and can be obtained as standardized parts, for example, according to DIN 3770, resulting in a cost advantage particularly for small quantities.

To enable assembly of the annular securing element in axial direction, a spring element preloading the captive securing device in axial direction is preferably compressible by at least one half of the thickness of the annular securing element measured in axial direction. In this way, the annular securing element, which was described above by way of example and which is formed as a circumferentially interrupted torus of high-strength spring steel with a full circular cross section having a diameter of 2 millimeters, can be inserted into the circumferential groove of the dome by axially compressing the spring element by at least one millimeter. After a subsequent unloading of the spring element, the toroidal securing element is snugly grasped by the captive securing device in a positive-locking manner and, at the same time, by one fourth of its circumferential surface area. However, the spring element is preferably compressible in axial direction by more than one half of the thickness of the annular securing element measured in axial direction in order to facilitate assembly.

According to a further development of one aspect of the invention, the spring element is surrounded in axial direction and radial direction simultaneously by the dome and by the captive securing device, respectively. By this arrangement, inter alia, a tolerance-dependent play between an inner bore hole of the captive securing device and a shoulder of the cylindrical dome receiving this inner bore hole can be compensated and a rattling in radial direction can accordingly be countered during driving operation. In particular, the spring element is at least substantially completely surrounded by the dome and by the captive securing device. The spring element is preferably surrounded at least substantially half by the dome and half by the captive securing device. Because it is surrounded in this way, the spring element is effectively protected against damage and contamination.

A spring element preloading the captive securing device in axial direction is advantageously arranged between the captive securing device and a circumferential shoulder of the dome. In this way, the spring element can be supported in axial direction directly at the dome without further component parts being required. In particular, the circumferential shoulder of the dome extends in radial direction.

In the area of the circumferential shoulder of the dome, the captive securing device preferably has an inner diameter which is greater than an outer diameter of the surrounding shoulder of the dome. In this way, the captive securing device can be moved in axial direction of the central joint past the shoulder when compressing the spring element in the course of mounting the annular securing element. In particular, an annular surface area of the captive securing device facing the joint ball is at least substantially at the same level as the shoulder of the dome in axial direction in a mounted condition of the central joint. Accordingly, the spring element is effectively protected from damage and contamination in the mounted state of the central joint. In particular, the above-mentioned annular surface area which functions as a stop surface when separation of the central joint is imminent extends in radial direction.

An advantageous further development of the invention provides that the three-point link is formed as an axle guide link for guiding a rigid axle.

The dome is advisedly formed integral with a flange plate for connecting the central joint to the rigid axle. As a result of the integral construction, no separation of the central joint can occur at this location and, therefore, no additional effort is required to prevent this.

BRIEF DESCRIPTION OF THE DRAWINGS

The invention will be explained in more detail in the following referring to drawings which show merely exemplary embodiments. Like, similar or functionally like component parts are designated with consistent reference numerals. The drawings show.

DETAILED DESCRIPTION OF THE PRESENTLY PREFERRED EMBODIMENTS

Figure 1:
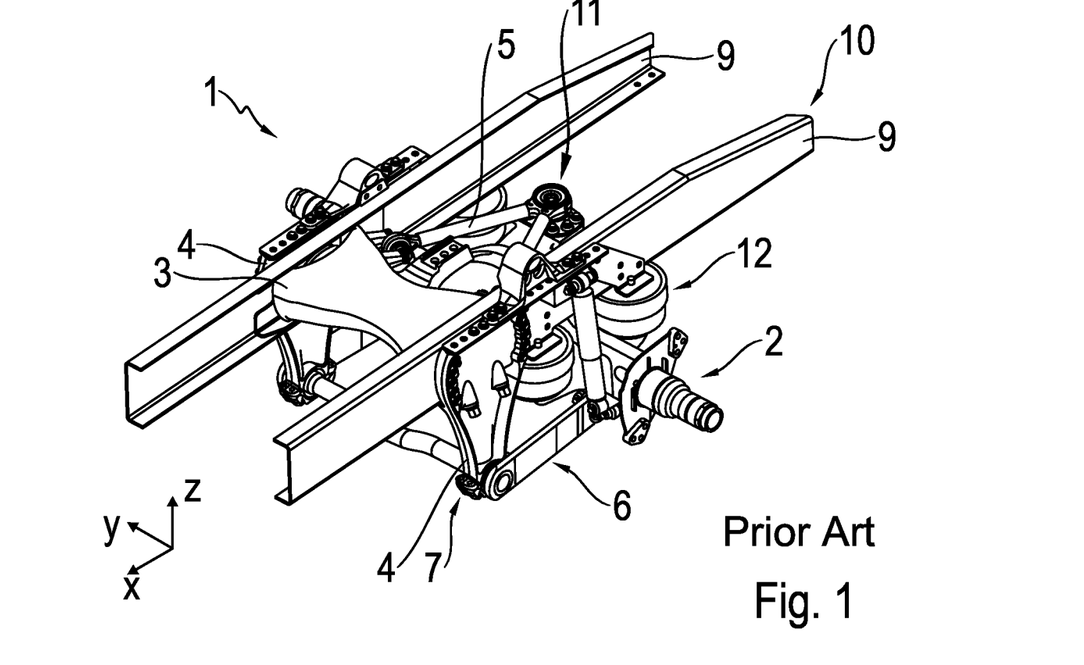
FIG. 1 is a perspective view of a suspension arrangement according to the prior art.

FIG. 1 shows a suspension arrangement 1 with a solid drive axle which is formed as a rigid axle and has a rigid axle body 2. Referring to a positive vehicle longitudinal direction x corresponding to the forward driving direction, the rear axle is arranged behind a cross member 3 extending in a vehicle transverse direction y and, on each vehicle side, a support 4 extending substantially in a vehicle vertical direction z. In an upper link plane referring to the positive vehicle vertical direction z, the rigid axle is pulled by an axle guide link which is spread in a V-shape, extends substantially in vehicle longitudinal direction x and is formed as a three-point link 5. The three-point link 5 is formed symmetrically with reference to a plane defined by the vehicle longitudinal direction x and the vehicle vertical direction z and has two molecular joints via which it is connected to the cross member 3. Further, the three-point link 5 has a central joint 11 for connecting the three-point link 5 to the rigid axle body 2 so as to be rotationally and swivelably moveable, the rotating and swiveling movements being enabled by a ball joint arranged inside of the central joint 11. The central joint 11 moves up and down during driving operation substantially in vehicle vertical direction z due to deflecting and rebounding movements of the rigid axle body 2.

In a lower link plane, the rigid axle is pulled through two trailing arms 6, which are arranged outside of the vehicle parallel to one another in vehicle transverse direction y and extend in vehicle longitudinal direction x. The trailing arms 6 are connected each at one end to the rigid axle body 2 and each at the other end to a lower force introduction region 7 of one of the two supports 4. The end regions of the trailing arms 6 are swivelable around a swiveling axis extending in vehicle transverse direction y relative to the lower force introduction region 7 and rigid axle body 2. The suspension arrangement 1 has a longitudinal beam 9 on each side of the vehicle at which the rigid axle body 2 is supported via pneumatic springs 12. The two longitudinal beams 9 extend parallel to one another in vehicle longitudinal direction x and, together with the cross member 3, make up a component part of a vehicle frame 10. The terms vehicle longitudinal direction x, vehicle transverse direction y and vehicle vertical direction z are used in the following analogous to FIG. 1.

Figure 2:
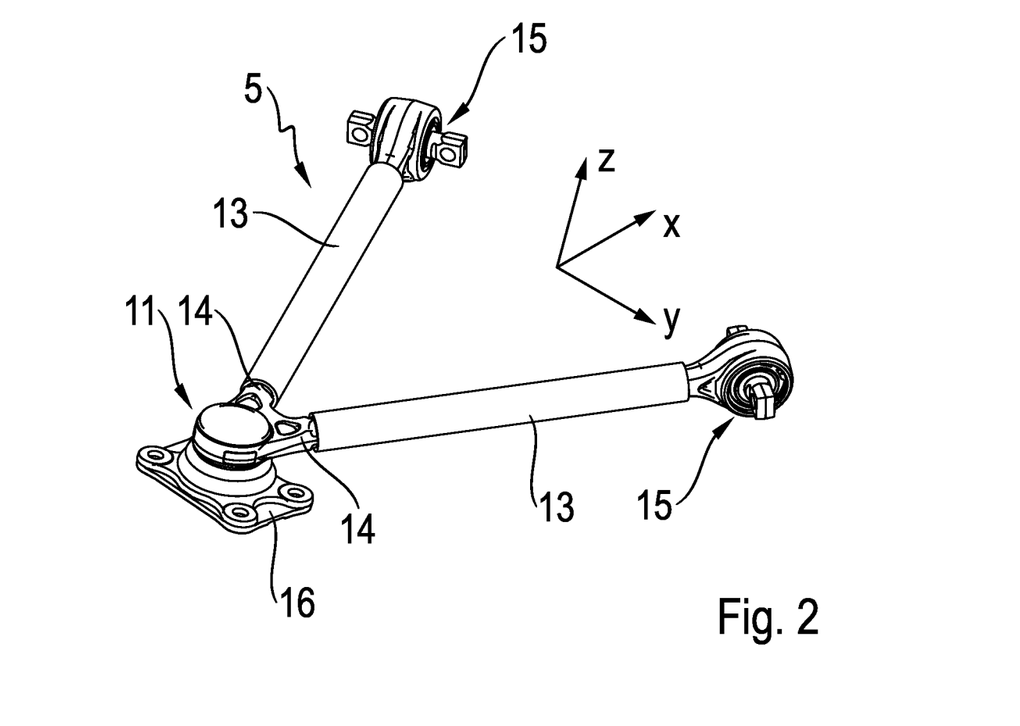
FIG. 2 is a perspective oblique top view of a three-point link.

FIG. 2 shows a three-point link 5 of a utility vehicle that is formed to be spread in a V-shape and has two tubular control arms 13 which, form an acute angle relative to one another and meet each at one end in a central joint 11. The two control arms 13 are connected in each instance rigidly at one of two shafts 14 of the central joint 11. Each of the two control arms 13 is rigidly connected at a free end to a guide joint which is formed in each instance as a molecular joint 15. The three-point link 5 is connectable to a vehicle frame 10 via the molecular joints 15 and to a rigid axle via a flange plate 16 of the central joint 11. Accordingly, the three-point link 5 is formed as an axle guide link for guiding a rigid axle.

Figure 3:
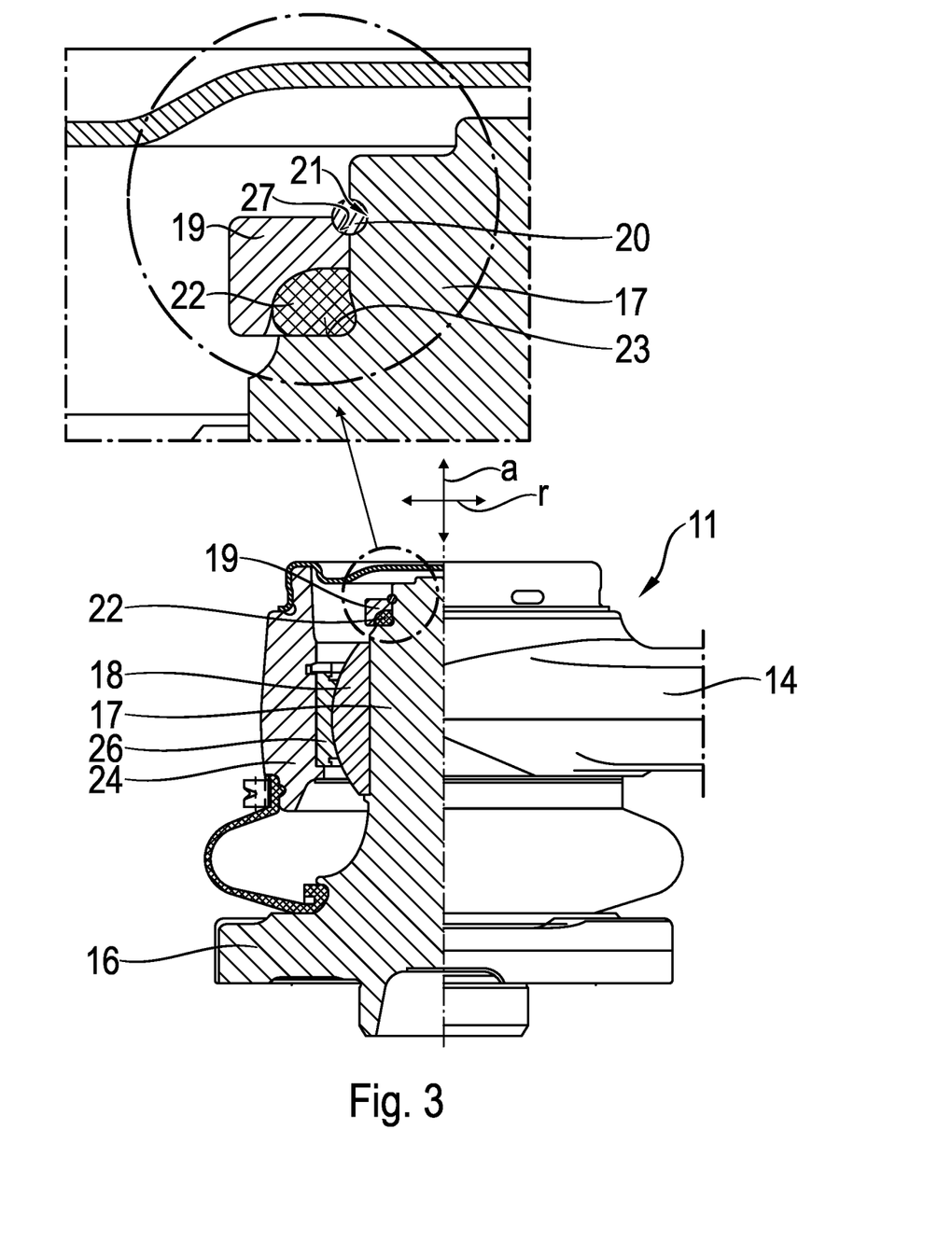
FIG. 3 is a half-section view of a central joint of the three-point link from FIG. 2 with enlarged detail.

As will be seen from FIG. 3, the central joint 11 has a cylindrical dome 17 that extends in an axial direction a which extends substantially perpendicular to a plane defined by the two control arms 13. In the depicted undeflected idle position of the central joint 11, the axial direction a does not extend exactly perpendicular to the plane defined by the two control arms 13 but rather deviates from the latter by 10 degrees. This deviation is necessary so that the structural component parts of the central joint 11 that move relative to one another in the installed condition of the three-point link 5 during a deflection and rebound of a rigid axle body 2 during a driving operation do not collide. In the present case, the undeflected idle position of the central joint 11 is at the same time the installed position in an unladen utility vehicle. The central joint 11 has a joint ball 18, which at the same time constitutes an inner race of a ball joint and is penetrated by the dome 17. In order to prevent a complete separation of the central joint 11, the central joint 11 has a captive securing device 19 which extends in a radial direction r oriented perpendicular to the axial direction a. The captive securing device 19 is likewise penetrated by the dome 17 and is secured at the same time against axial withdrawal from the dome 17 by an annular securing element 20. The annular securing element 20 viewed in axial direction a is arranged on a side of the captive securing device 19 remote of the joint ball 18 and simultaneously engages in a circumferential groove 21 of the dome 17. The annular securing element 20 is snugly surrounded in radial direction r by the captive securing device 19 so as to prevent the annular securing element 20 from coming loose from the circumferential groove 21 of the dome 17 because the annular securing element 20 cannot move out of the circumferential groove 21 of the dome 17 in radial direction r.

The annular securing element 20 is virtually completely circumferentially surrounded by the captive securing device 19 in radial direction r, this annular securing element 19 having a circumferential interruption which is required in order to allow the annular securing element 19 to be inserted into the circumferential groove 21 of the cylindrical dome 17. The captive securing device 19 makes full surface contact with the annular securing element 20 such that the annular securing element 20 in turn contacts the captive securing device 19 to form a contact surface which substantially surrounds the dome 17. This contact surface is formed as a quarter-circle curve when viewed in an axial section through the central joint 11. The annular securing element 20, which is formed toroidal and has a circular full cross section at the same time, makes full surface contact with the circumferential groove 21 of the cylindrical dome 17. The annular securing element 20 contacts the groove 21 of the cylindrical dome 17 to form a contact surface surrounding the dome 17. When viewed in an axial section through the central joint 11, this contact surface is formed as a semicircular curve. Accordingly, the annular securing element 20 is snugly surrounded in a positive-locking manner by the circumferential groove 21 of the cylindrical dome 17 and by the captive securing device 19 particularly over three fourths of its entire outer circumferential surface area; or, in other words, only one fourth of the entire outer circumferential surface area of the annular securing element 20 is exposed.

The captive securing device 19 is preloaded in axial direction a by a spring element 22 which is formed as an O-ring 22 from an elastomer material. The O-ring 22 is compressible in axial direction a by somewhat more than one half of the thickness of the annular securing element 20 to allow the annular securing element 20 to be mounted. The spring element 22 is surrounded in axial direction a and simultaneously also in radial direction r by the dome 17 and by the captive securing device 19. The spring element 22 preloading the captive securing device 19 in axial direction a is arranged between the captive securing device 19 and a circumferential shoulder 23 of the dome 17, which circumferential shoulder 23 extends in radial direction r. In the area of the circumferential shoulder 23 of the dome 17, the captive securing device 19 has an inner diameter which is greater than the outer diameter of the surrounding shoulder 23 of the dome 17. In this way, the captive securing device 19 can be moved in axial direction a of the central joint 11 past the shoulder 23 when compressing the spring element 22 in the course of mounting the annular securing element 20. In the mounted condition of the central joint 11, an annular surface area of the captive securing device 19 facing the joint ball 18 is at the same level as the shoulder 23 of the dome 17 in axial direction. At the same time, the above-mentioned annular surface area which would function as a stop surface for the joint ball 18 if separation of the central joint were imminent extends in radial direction r.

When viewed in parallel projection in axial direction a, the captive securing device 19 partially covers the joint ball 18. However, in this way, in the mounted state of the central joint 11, it is possible for the joint ball 18 to axially withdraw from the dome 17 after a prior shearing off of the toroidal securing element 20 made of high-strength spring steel accompanied by the formation of a cylindrical shell-shaped shearing surface. The three-point link 5 is formed as an axle guide link for guiding a rigid axle with a rigid axle body 2 similar to FIG. 1. At the same time, the dome 17 is formed integral with the flange plate 16 to connect the central joint 11 to the rigid axle.

Figure 4:
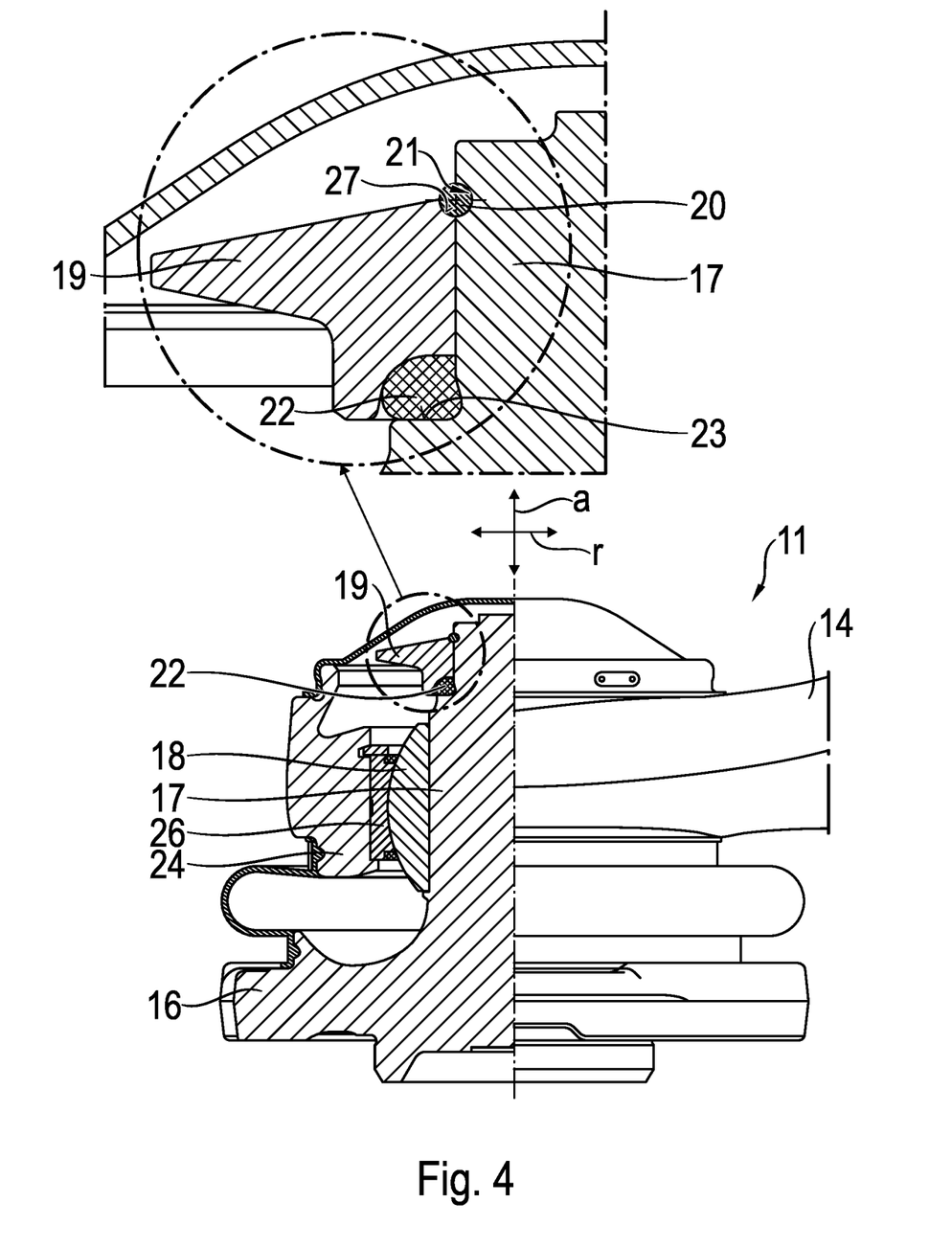
FIG. 4 is a half-section view of a central joint of the three-point link from FIG. 2 with enlarged detail similar to FIG. 3.

FIG. 4 shows a central joint 11 which differs from the central joint 11 shown in FIG. 3 in that the captive securing device 19 covers portions of an inner contour of a housing 24 of the central joint 11 viewed in parallel projection in axial direction a. This arrangement has the advantage that a separation of the central joint 11 is prevented in case the joint ball 18 should disengage from a bearing shell 26 surrounding the joint ball 18 due to wear. The bearing shell 26 is a component part of a ball joint. The ball joint is formed from the joint ball 18 which is also referred to as inner race of the ball joint and from the bearing shell 26 which is also referred to as outer race of the ball joint.

Figure 5:
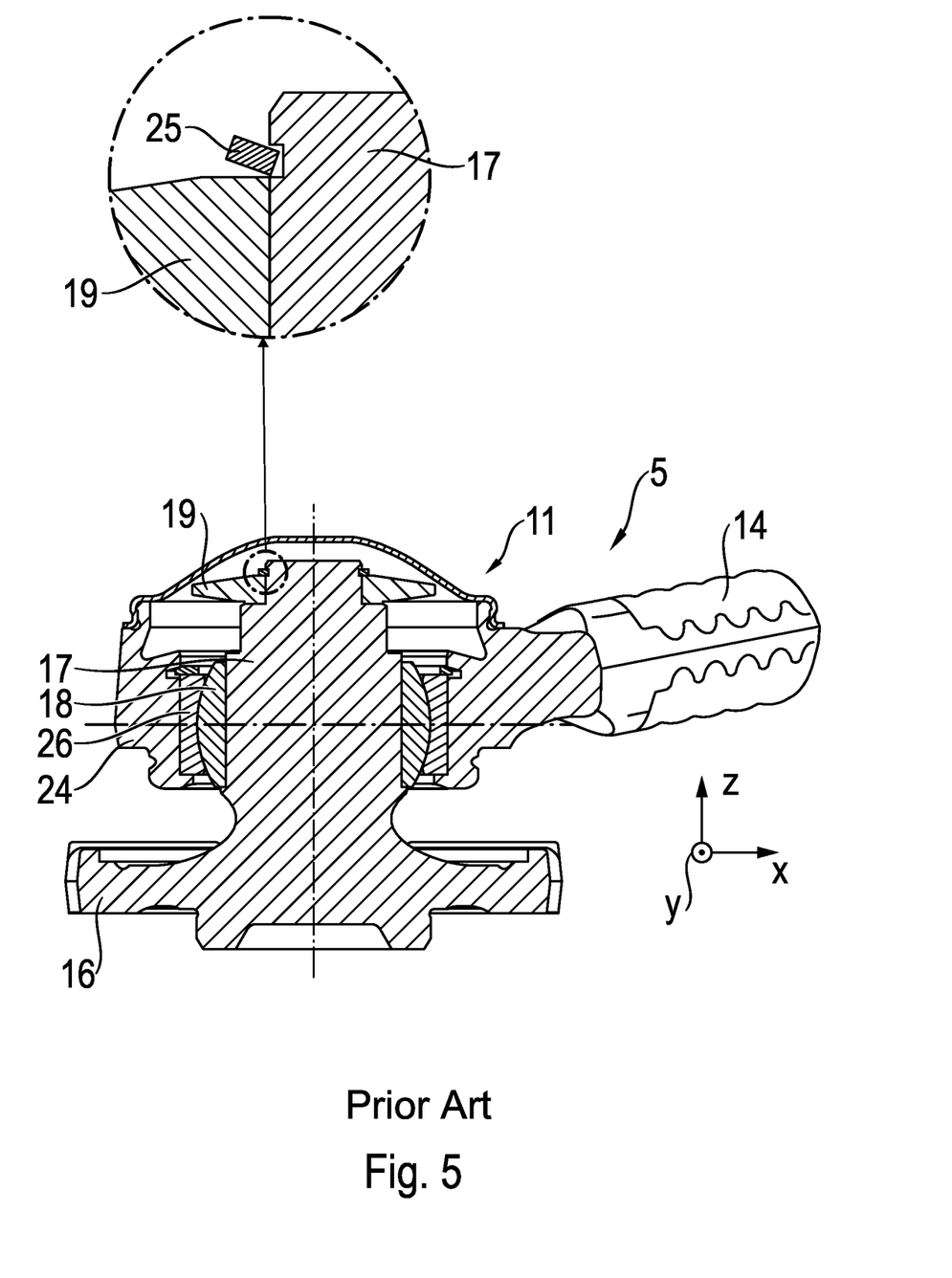
FIG. 5 is a sectional view of a central joint according to the prior art.

A central joint 11 of a three-point link 5 known from the prior art and shown in FIG. 5 has a housing 24 which is mounted so as to be rotationally and swivelably movable relative to an axle connection of the central joint 11 by a ball joint. Further, the central joint 11 has a captive securing device 19 which functions as a stop and which extends perpendicular to the centerline of the axle connection and prevents a separation of the housing 24 and axle connection in the event of failure of the ball joint. A securing element which is formed as a retaining ring 25 with rectangular cross section constitutes an axial securing element and prevents a withdrawal of the captive securing device in direction of the centerline of the axle connection. The axle connection has a cylindrically-shaped dome 17 which has a centerline which is coextensive with the centerline of the axle connection. The retaining ring 25 with rectangular cross section engages in a circumferential, likewise rectangular groove 21 of the cylindrical dome 17. In an arrangement of this kind, there is a risk during driving operation that the retaining ring will come loose as is shown schematically in the enlarged detail.

Figure 6:
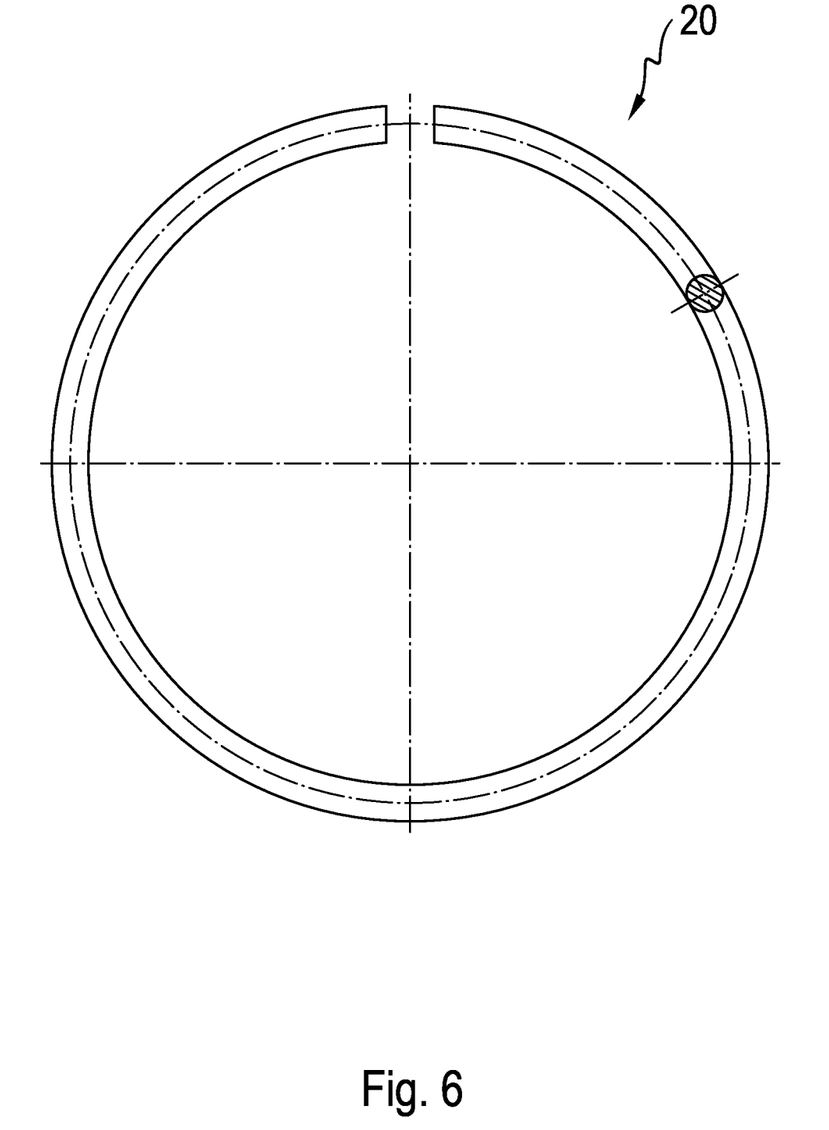
FIG. 6 is a top view of an annular securing element.

As will be apparent from FIG. 6, the annular securing element 20 of the central joints 11 according to FIG. 3 and FIG. 4 has a circular full cross section and is simultaneously formed as a circumferentially uninterrupted torus made from a high-strength spring steel. Geometrically, the annular securing element 20 corresponds to that of a round-wire snap ring for shafts in accordance with DIN 7993, type A.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:
1. A three-point link comprising:
a central joint; and
two control arms that form an acute angle relative to one another and which simultaneously meet each other at one end in the central joint,
wherein the central joint has:
a cylindrical dome that extends in an axial direction extending at least substantially perpendicular to a plane defined by the two control arms having a circumferential groove;
a joint ball penetrated by the cylindrical dome;
a captive securing device functions as a stop and extends in a radial direction oriented perpendicular to the axial direction and is configured to prevent a complete separation of the central joint;
an annular securing element, wherein the captive securing device is penetrated by the cylindrical dome and is simultaneously secured against an axial withdrawal from the cylindrical dome by the annular securing element,
wherein, viewed in the axial direction, the annular securing element is arranged on a side of the captive securing device remote of the joint ball and engages in the circumferential groove of the cylindrical dome, and wherein the annular securing element is snugly surrounded in radial direction by the captive securing device to prevent a withdrawal of the annular securing element from the circumferential groove of the cylindrical dome whereby the annular securing element cannot move out of the circumferential groove of the cylindrical dome in a radial direction.

2. The three-point link according to claim 1, wherein the annular securing element is surrounded in radial direction circumferentially at least in parts by the captive securing device.

3. The three-point link according to claim 1, wherein the annular securing element has a circular full cross section.

4. The three-point link according to claim 1, wherein the captive securing device makes full surface contact with the annular securing element.

5. The three-point link according to claim 1, wherein the annular securing element makes full surface contact with the circumferential groove of the cylindrical dome.

6. The three-point link according to claim 1,
wherein the annular securing element contacts the captive securing device such that it forms a contact surface at least substantially surrounding the cylindrical dome, and wherein the contact surface is formed as a quarter-circle curve when viewed in an axial section through the central joint.

7. The three-point link according to claim 1, further comprising:

a spring element configured to preload the captive securing device in the axial direction.

8. The three-point link according to claim 7, wherein the spring element is an O-ring of elastomer material.

9. The three-point link according to claim 7, wherein the spring element is surrounded in the axial direction and the radial direction simultaneously by the cylindrical dome and by the captive securing device, respectively.

10. The three-point link according to claim 7, wherein the spring element is arranged between the captive securing device and a circumferential shoulder of the cylindrical dome.

11. The three-point link according to claim 10, wherein, in an area of the circumferential shoulder of the cylindrical dome, the captive securing device has an inner diameter which is greater than an outer diameter of the circumferential shoulder of the cylindrical dome.

12. The three-point link according to claim 1, further comprising:

a spring element configured to preload the captive securing device in the axial direction is compressible by at least one half of a thickness of the annular securing element measured in the axial direction to enable assembly of the annular securing element in axial direction.

13. The three-point link according to claim 1, wherein the three-point link is an axle guide link configured to guide a rigid axle.

14. Three-point link according to claim 13, wherein the cylindrical dome is formed integral with a flange plate configured to connect the central joint to the rigid axle.

* * * * *